US011524479B2

(12) United States Patent
Hijosa et al.

(10) Patent No.: US 11,524,479 B2
(45) Date of Patent: Dec. 13, 2022

(54) NATURAL NONWOVEN MATERIALS

(75) Inventors: Carmen Hijosa, London (GB); Anna Ribé Gallart, Barcelona (ES); Javier Jiménez Romero, Barcelona (ES); Roshan Paul, Barcelona (ES); Marolda Brouta-Agnésa, Barcelona (ES)

(73) Assignee: ANANAS ANAM UK LIMITED

( * ) Notice: Subject to any disclaimer, the term of this patent is extended or adjusted under 35 U.S.C. 154(b) by 0 days.

(21) Appl. No.: 13/699,925

(22) PCT Filed: May 25, 2011

(86) PCT No.: PCT/GB2011/000802
§ 371 (c)(1),
(2), (4) Date: Feb. 27, 2013

(87) PCT Pub. No.: WO2011/148136
PCT Pub. Date: Dec. 1, 2011

(65) Prior Publication Data
US 2013/0149512 A1    Jun. 13, 2013

(30) Foreign Application Priority Data

May 25, 2010  (GB) .................................... 1008729
Jun. 29, 2010  (GB) .................................... 1010985

(51) Int. Cl.
B32B 5/02       (2006.01)
D06N 3/00      (2006.01)
(Continued)

(52) U.S. Cl.
CPC ................ *B32B 5/022* (2013.01); *B32B 5/26* (2013.01); *D04H 1/425* (2013.01);
(Continued)

(58) Field of Classification Search
None
See application file for complete search history.

(56) References Cited

U.S. PATENT DOCUMENTS 4,143,198 A * 3/1979 Sinn ........................... C08J 9/28
427/246
4,190,694 A    2/1980 Mück et al.
(Continued)

FOREIGN PATENT DOCUMENTS

CN     101575737 A    11/2009
DE       20300098    *  3/2003
(Continued)

OTHER PUBLICATIONS

Abstract of DE20300098, Mar. 2003, Quadrant Plastic Composites.*
(Continued)

*Primary Examiner* — Shawn Mckinnon
(74) *Attorney, Agent, or Firm* — K&L Gates LLP

(57) ABSTRACT

There is described a nonwoven material comprising a multilayered stack, the multilayered stack comprising discrete interconnected layers, each of the layers, which may be the same or different, comprising a composite fibre of from about 80 to 100% w/w leaf or stem fibre and from about 1 to 20% w/w of a polymer, wherein the polymer is fusible at a temperature of about 180° C. or less. There is also described a novel method of enzyme degumming leaf and/or stem fibres.

52 Claims, 8 Drawing Sheets

Figure 4:

(51) Int. Cl.
   *D04H 1/498* (2012.01)
   *D04H 1/46* (2012.01)
   *D04H 1/425* (2012.01)
   *D06N 3/04* (2006.01)
   *B32B 5/26* (2006.01)
   *D04H 1/4266* (2012.01)
   *D04H 1/593* (2012.01)

(52) U.S. Cl.
   CPC ............. *D04H 1/4266* (2013.01); *D04H 1/46* (2013.01); *D04H 1/498* (2013.01); *D04H 1/593* (2013.01); *D06N 3/0011* (2013.01); *D06N 3/0013* (2013.01); *D06N 3/0015* (2013.01); *D06N 3/042* (2013.01); *B32B 2255/02* (2013.01); *B32B 2255/26* (2013.01); *B32B 2260/021* (2013.01); *B32B 2260/023* (2013.01); *B32B 2260/046* (2013.01); *B32B 2262/06* (2013.01); *D06N 2201/04* (2013.01); *D06N 2211/28* (2013.01); *Y10T 156/10* (2015.01); *Y10T 428/24942* (2015.01); *Y10T 442/671* (2015.04)

(56) References Cited

U.S. PATENT DOCUMENTS

| | | | | |
|---|---|---|---|---|
| 2002/0081418 | A1* | 6/2002 | Iijima | D06N 3/0075 428/151 |
| 2003/0088220 | A1* | 5/2003 | Molander et al. | 604/370 |
| 2004/0123963 | A1* | 7/2004 | Chen et al. | 162/134 |
| 2005/0214511 | A1* | 9/2005 | Vogt | B32B 3/28 428/172 |
| 2007/0199669 | A1* | 8/2007 | Yang | D21C 3/02 162/90 |
| 2011/0006454 | A1* | 1/2011 | Kawashiri | B27N 3/04 264/176.1 |
| 2013/0337711 | A1* | 12/2013 | Wool | C08K 7/02 442/153 |

FOREIGN PATENT DOCUMENTS

| | | |
|---|---|---|
| EP | 0158156 A1 | 10/1985 |
| EP | 1013290 A1 | 6/2000 |
| FR | 2322234 A1 | 3/1977 |
| FR | 2482144 A1 | 11/1981 |
| FR | 2657364 A1 | 7/1991 |

OTHER PUBLICATIONS

Gulwani et al. (http://www.slideshare.net/mobile/suman159/final-leaf-processing-presentation2010), Jun. 22, 2010 online.*
Blackburn (Biodegradable and Sustainable Fibres, Elsevier, Nov. 2005, pp. 57-58) (Year: 2005).*
Ghosh et al. (Tensile Behaviour and Processing of Bleached Yarn from Pineapple Leaf Fibre, Indian J. Text. Res., vol. 13, Mar. 1988, pp. 17-20) (Year: 1988).*
"Study of Enzymatic Degumming of Pineapple Leaf Fiber", Journal of Textile Research, Liu et al., 2006 (Year: 2006).*
Blackburn (Biodegradable and Sustainable Fibres, Elsevier, Nov. 2005, pp. 57-58, 323 and 336) (Year: 2005).*
PCT International Search Report for International Application No. PCT/GB2011/000802, dated Feb. 12, 2011, 3 pages.
PCT Written Opinion of the International Searching Authority for International Application No. PCT/GB2011/000802, dated Feb. 12, 2011, 6 pages.

* cited by examiner

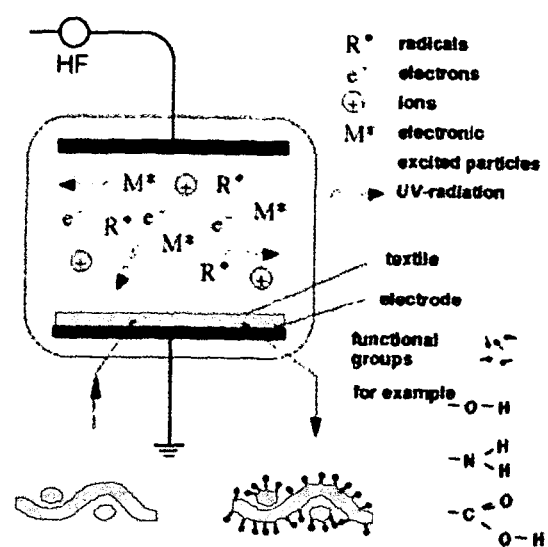
Figure 1
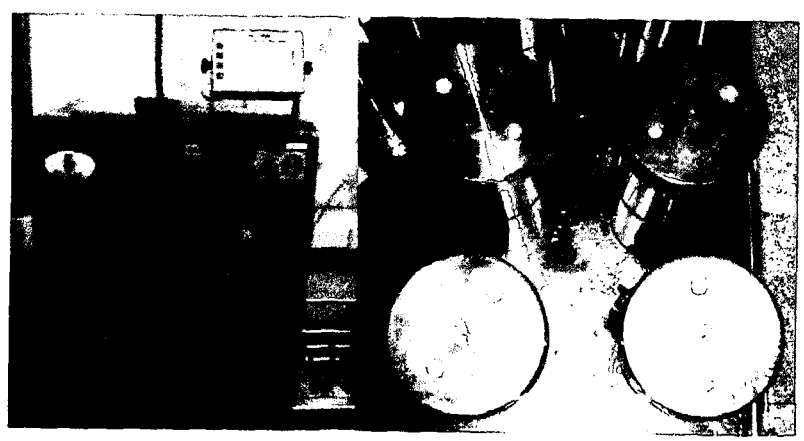
Figure 2. Ugolini equipment and solution containers

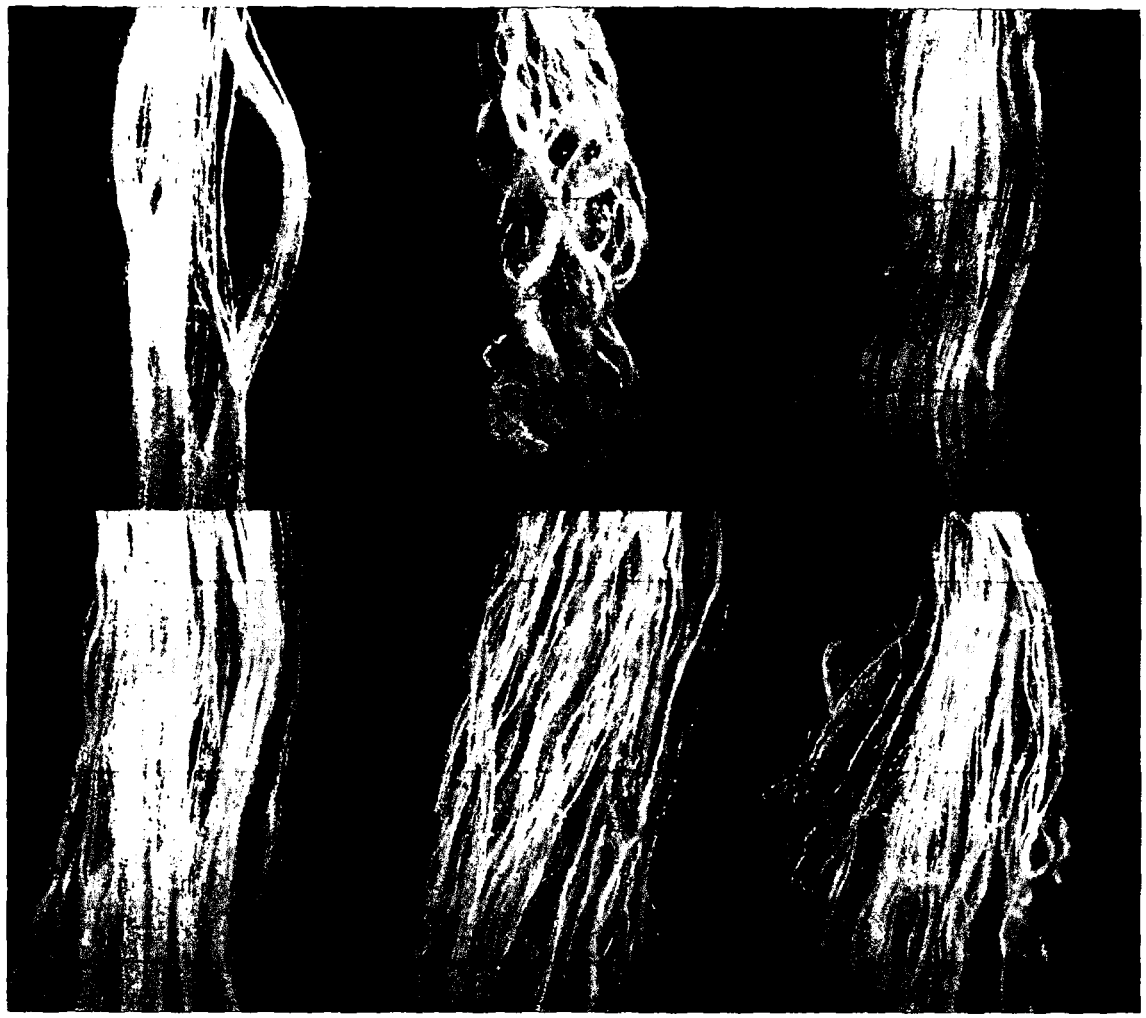
Figure 3a to e. Left to right: untreated fibres, conventionally treated fibres, B11 8, B12 8, B13 8 and B14 8.

NATURAL NONWOVEN MATERIALS

CROSS-REFERENCE TO RELATED APPLICATIONS

This application claims priority of and is a National Phase Application under 35 USC 371 of PCT/GB2011/000802, filed May 25, 2011 (published as WO 2011/148136), which claims benefit of priority of Great Britain Application No. 1008729.4, filed May 25, 2010 and benefit of priority of Great Britain Application No. 1010985.8, filed Jun. 29, 2010. The disclosures of the prior applications are considered part of and are incorporated by reference in their entirety in the disclosure of this application.

FIELD OF THE INVENTION

The present invention relates to a novel multiple layered stack material or web material made substantially from natural fibres that is suitable for a variety of applications, to uses thereof and to methods of manufacture. The present invention also relates to novel methods of preparing the natural fibres and of processing them to a natural nonwoven fabric material.

More particularly the present invention relates to a natural multiple layered nonwoven stack material or web material that, inter alia, can have the appearance of leather.

It should be understood that the use of the novel natural web material should not be limited to a leather substitute as hereinafter described.

BACKGROUND OF THE INVENTION

The present invention is based on research on a wide range of natural leaf or stem fibres, including, for example, pineapple leaf fibre (PALF).

The main sources of pineapple originate from Brazil, Thailand and the Philippines. In 2008 the top 20 pineapple producing countries produced more than 17 million MT of pineapple as is illustrated in Table I below:

| Rank | Country | 2008 Production (Int $1000) | Production (MT) | % of top 20 production |
|---|---|---|---|---|
| 1 | Brazil | 481922 | 2491974 | 14.2 |
| 2 | Thailand | 440651 | 2278566 | 13.0 |
| 3 | Philippines | 427263 | 2209336 | 12.6 |
| 4 | Costa Rica | 324532 | 1678125 | 9.6 |
| 5 | China | 271144 | 1402060 | 8.0 |
| 6 | India | 252528 | 1305800 | 7.5 |
| 7 | Indonesia | 246139 | 1272761 | 7.3 |
| 8 | Nigeria | 174051 | 900000 | 5.1 |
| 9 | Mexico | 132627 | 685805 | 3.9 |
| 10 | Viet Nam | 90893 | 470000 | 2.7 |

Source UN Food and Agriculture Statistics

In Brazil, Thailand, the Philippines and elsewhere, when the pineapple fruit is harvested, the pineapple leaves are mostly left to rot. Hitherto, a small amount has been used to extract pineapple leaf fibre, which is used as a filament or blended with cotton, nylon or similar natural or synthetic based fibres and spun into yarn. The yarn produced may be used in the making of woven textiles, etc.

The pineapple leaf fibres used to make the new natural nonwoven material hereinafter described are a by-product of the pineapple fruit harvest. Currently they are left to decompose after the fruit harvest. Thus, the income of pineapple farmers in Thailand, the Philippines and elsewhere, would be enhanced by the fibre extraction processes needed in the production of this new natural nonwoven material hereinafter described. The technology, when completed, will be transferable to other regions of the world which are large producers of pineapple.

A suitable use of pineapple leaf fibre would be economically beneficial to pineapple farmers, it would also provide a material from renewable resources, that is otherwise often discarded as waste material.

The natural nonwoven material is environmentally advantageous because, inter alia, it does not require additional land, energy and fertiliser for the crop, as is the case for other natural fibres such as cotton. Nor does it compete for land resources used in the food industry which contrasts to cotton and PLA.

The present invention provides a material based on a biodegradable material that has good tensile strength and a fine denier. Furthermore, inter glia, the natural nonwoven fibre, e.g. pineapple fibre, material is stitchable and can be used as a substitute material in making, for example, furnishings, clothing, home interiors, panels, bags, luggage, the car industry, shoes, accessories, etc.

The present invention provides that such a natural nonwoven fibre may have a variety of utilities, including, but not limited to, artificial leather as hereinbefore described.

European Patent application No. 1 013 290 describes a multilayer absorbent composite comprising an absorbent core of cellulose wood pulp fibres. The absorbent composite is produced by an air laying process.

In the preparation of natural nonwoven fibres from plant leaf and stem material it is necessary to treat the leaf and stem material to remove the gum that holds the leaf and stem material together. Conventional methods of degumming natural fibres comprise chemical processes, usually the use of a base such as aqueous sodium hydroxide or ammonium hydroxide. However, the use of caustic soda can damage the fibre itself and usually a coarse fibre may be produced which may require the use of an additional softening agent.

SUMMARY OF THE INVENTION

Therefore, there is a need for natural materials which may be obtained from existing resources using environmentally friendly techniques.

Thus, according to a first aspect of the present invention, there is provided a natural nonwoven material comprising a multilayered stack, the multilayered stack comprising discrete interconnected layers, each of the layers, which may be the same or different, comprising a composite fibre material of from about 80 to 100% w/w leaf or stem fibre and from about 0 to 20% w/w of a polymer, wherein the polymer is fusible at a temperature of about 180° C. or less.

Preferably, the natural nonwoven composite material does include fusible polymer, thus, the fusible polymer content may be from about 1 to 20% w/w, preferably from about 2 to 20% w/w, preferably from about 3 to 20% w/w, preferably from about 4 to 20% w/w, more preferably from about 5 to 20% w/w.

Leaf fibres generally comprise naturally occurring or cultivated fibres that have a high cellulose content, e.g. about 70% w/w or more. The multilayered stack material of the invention may comprise a single source of leaf fibre or a composite of leaf fibres or a composite of one or more leaf fibre and one or more stem fibres. The natural fibre may comprise a leaf fibre or a stem fibre and mixtures thereof. Preferably, the natural fibre comprises a leaf fibre. When the natural material comprises only leaf fibre, it may be based on a single source of leaf or a mixture of leaves.

A preferred leaf fibre comprises the leaves of one or more plants of the Bromeliaceae family, such as, *Ananas Comosus* (Linn), e.g. PALF. Alternatively, fibres such as abaca or sisal (*Agave sisalana*) may be used either alone or as a composite with PALF. Abaca fibres are leaf fibres from banana plants, such as, *Musa acuminata* or *Musa balbisiana*, etc. When a stem fibre is included in a composite material of the invention may comprise a variety of conventionally known stem fibres may be used, for example, flax, jute, ramie and hemp. An especially preferred leaf fibre comprises the leaves of one or more plants of the Bromeliaceae family, such as, *Ananas Comosus* (Linn), pineapple. However, it will be understood by the person skilled in the art that mixtures of leaf and stem fibres, for example, fibres that may have a relatively high content of pineapple leaf fibres, may be used in the multilayered stack material of this aspect of the invention. When the nonwoven multilayered stack material of the invention comprises a composite material including leaf and stem fibres, preferably a majority of the material comprises a leaf fibre, such as PALF. Thus, in a composite material the leaf fibre may comprise at least 50% w/w of the leaf/stem fibre content, preferably at least 60% w/w of the leaf/stem fibre content, preferably at least 70% w/w of the leaf/stem fibre content preferably at least 80% w/w of the leaf/stem fibre content, preferably at least 90% w/w of leaf/stem fibre content and especially at least 95% w/w of the leaf/stem fibre content. When a mixture of leaf fibres is used it is desirable that a major part of the leaf fibre is PALF. Thus, at least 50% w/w of the leaf fibre content is PALF, preferably at least 60% w/w of the leaf fibre content is PALF, preferably at least 87% w/w of the leaf fibre content is PALF, preferably at least 80% w/w of the leaf fibre content is PALF, preferably at least 90% w/w of the leaf fibre content is PALF and especially at least 95% w/w of the leaf fibre content is PALF. In one aspect of the present invention when the leaf fibre is PALF, the natural nonwoven material may comprise about 100% w/w leaf fibre, i.e. no fusible is added. Preferably the leaf or stem fibre is degummed prior to use using conventional degumming methods known in the art or other degumming methods described herein.

When a fusible polymer is used as described herein, the polymer may be fusible at a temperature of about 180° C. or less, preferably about 170° C. or less, preferably about 160° C. or less, preferably about 150° C. or less, preferably about 140° C. or less, preferably about 130° C. or less, preferably about 120° C. or less, preferably about 110° C. or less, preferably about 100° C. or less, more preferably about 90° C., more preferably about 80° C. or less, more preferably about 60° C. or less. Thus, the polymer may be fusible at a temperature of from about 50 to 120° C., preferably from about 60 to 110° C., preferably from about 60 to 110° C., preferably from about 70 to 100° C., more preferably from about 70 to 80° C.

The multilayered leaf/polymer fibre (including 100% leaf fibre as hereinbefore described) may be formed into multi-layered material as hereinbefore described in a variety of methods conventionally known by the person skilled in the art. However, preferably each of the fibre layers are air laid. The process of air laying will generally be known by the person skilled in the art.

One or more of the material layers may be associated with a curable material, such as a resin. The curable material may be cured by any conventional means, thus, it may be temperature curable, e.g. heat curable; light curable, e.g. UV curable; chemically curable; etc. Thus, a suitable curable material may comprise a resin, such as an olephinic resin, e.g. an acrylic resin, such as a hydrophilic acrylic resin, e.g. a soft hydrophilic acrylic resin.

Preferably, each of the material layers is associated with the curable material, although it will be understood by the person skilled in the art that a suitable multilayered stack material may be obtained if a portion of the layers is associated and/or only a region of each layer is associated with a curable material. However, in a preferred aspect of the invention substantially each layer of the multilayered stack material is associated with a curable material and substantially the whole of each layer is associated with the curable material.

The curable material associated with the layers of the nonwoven multilayered stack material may be coated onto the nonwoven material or impregnated into the nonwoven material in a variety of conventionally known manners. However, preferably, the curable material is impregnated into one or more of the layers of the multilayered nonwoven stack material.

Desirably the nonwoven stack material of the invention is provided with a pigmented curable material, e.g. as a coating, such as a surface coating of a pigmented curable material. The pigmented curable material of this aspect of the invention may comprise the same curable material as that associated with the material as hereinbefore described, such as a hydrophilic acrylic resin but including a colour pigment. Alternatively, the pigment may be applied in a different curable material.

The choice of such pigments will be well understood by the person skilled in the art and will comprise conventional pigments.

The pigmented curable material may be applied as a coating so that the nonwoven material is provided with a colour finishing.

Once the nonwoven material comprising the fusible polymer is heated to the appropriate temperature so as to cure the material, a nonwoven material is produced which, with the appropriate treatment, as described herein can resemble leather.

The nonwoven material of the present invention will have a suitable tensile strength and elongation. The tensile strength may vary depending, inter alia, upon the source of the leaf fibre, the method of degumming, etc.

Pineapple leaf fibre is especially suitable since it produces fibres which are, inter alia, fine, e.g. they may have a denier of from about 10 to 20 tex, preferably from about 14 to 18 tex.

The natural nonwoven material of the invention may be useful as an artificial leather material. Thus, according to one aspect of the invention there is provided the use of a material as hereinbefore described in the manufacture of an artificial leather.

The invention further provides a cured material comprising a multiple layered nonwoven stack, the multilayered stack nonwoven comprising discrete interconnected layers, each of the layers, which may be the same or different, comprising a composite fibre of from about 80 to 100% w/w leaf or stem fibres and from about 0 to 20% w/w of a cured polymer.

In this aspect of the invention the polymer is such that it would be fusible at a temperature of about 180° C. or less as hereinbefore described, but the polymer is in its cured, i.e. hardened, state.

This cured material can resemble leather and therefore according to this aspect of the invention there is provided an artificial leather comprising a multiple layered stack, the multilayered stack comprising discrete interconnected layers, each of the layers, which may be the same or different, comprising a composite fibre of from about 80 to 100% w/w leaf or stem fibre and from about 0 to 20% w/w of a polymer, wherein the polymer is fusible at a temperature of about 180° C. or less and wherein the polymer is in its cured state.

A variety of fusible polymers known to the person skilled in the art may be used in the material of the present invention. Such polymers may comprise a synthetic polymer or, preferably, a natural, e.g. biodegradable polymer. Such polymers include, but shall not be limited to, acrylonitrile butadiene styrene (ABS); acrylic (PMMA); polyetheretherketone; cellulose acetate; cyclic olefin copolymer (COC); ethylene vinyl acetate (EVA); ethylene vinyl alcohol (EVOH); fluoroplastics, such as, PTFE, FEP, PFA, CTFE, ECTFE and ETFE; ionomers; acrylic/PVC alloy; liquid crystal polymer (LCP); polyoxymethylene (POM or acetal); polyacrylates (Acrylic); polyacrylonitrile (PAN or acrylonitrile); polyamide (PA or Nylon); polyamide-imide (PAD; polyaryletherketone (PAEK or Ketone); polybutadiene (PBD); polybutylene (PB); polybutylene terephthalate (PBT); polycaprolactone (PCL); polychlorotrifluoroethylene (PCTFE); polyethylene terephthalate (PET); polycyclohexylene dimethylene terephthalate (PCT); polycarbonate (PC); polyhydroxyalkanoates (PHAs); polyketone (PK); polyester; polyethylene (PE); polyetheretherketone (PEEK); polyetherketoneketone (PEKK); polyetherimide (PEI); chlorinated polyethylene (CPE); polyimide (PI); polylactic acid (PLA); polymethylpentene (PMP); polyphenylene oxide (PPO); polyphenylene sulphide (PPS); polyphthalamide (PPA); polypropylene (PP); polystyrene (PS); polysulphone (PSU); polytrimethylene terephthalate (PTT); polyurethane (PU); polyvinyl acetate (PVA); polyvinyl chloride (PVC); polyvinylidene chloride (PVDC); and styrene-acrylonitrile (SAN); etc. Desirably the polymer is hydrophilic.

According to a further aspect of the present invention, there is provided a process of making a nonwoven material and a cured material, e.g. a leather substitute material.

Thus, according to a further aspect of the invention there is provided a process of making a nonwoven material comprising a multilayered stack, the multilayered stack comprising discrete interconnected layers, each of the layers, which may be the same or different, comprising a composite fibre of from about 80 to 100% w/w leaf or stem fibre and from about 0 to 20% w/w of a polymer, wherein the polymer is fusible at a temperature of about 180° C. or less, the process comprising:
 a) forming a stack composed of a plurality of layers of leaf or stem fibres, the fibres of each of the plurality of layers being interconnected with the fibres of an adjacent layer;
 b) interconnecting the plurality of layers together, to form a nonwoven multilayered mat;
 c) applying a fusible material to the mat.

The aforementioned process produces the nonwoven material of the invention.

A cured material, e.g. an artificial leather, may be produced by following steps a) to c) followed by:
 d) optionally pressing and fusing, e.g. thermally, the fusible material to form a composite with the leaf or stem fibres;
 e) applying an optionally pigmented flexible hydrophilic curable material;
 f) curing the curable material; and
 e) optionally tumbling the composite cured material.

The step of tumbling is known in the art, particularly the art of leather manufacture. Tumbling is necessary to produce an artificial leather according to the invention, although it may not be necessary for the production of other materials, such as those for interior use, e.g. carpets, furniture, mats, etc.

The step of thermally fusing the layers comprising the flexible hydrophilic thermally fusible material may be carried out simultaneously, sequentially or separately to the step of pressing the mat. Prior to the fibre being air laid, it is desirably carded and/or combed. For the avoidance of doubt, the process of carding and/or combing is intended to open, untangle and straighten the fibres prior to air laying.

In the process of this aspect of the invention a variety of leaf or stem fibres may be used including optionally a mixture of leaf or stem fibres. However, preferably the leaf or stem fibre is substantially or wholly pineapple leaf fibre.

In the process of this aspect of the invention the method of interconnection of the plurality of layers may comprise any such methods conventionally known in the art. Such methods include, but shall not be limited to, needle punching, hydroentanglement, air laying, etc. each of the layers, to form a nonwoven interconnected material. Preferably, the method of interconnection comprises air laying.

Any curable materials, especially hydrophilic curable materials, conventionally known to the person skilled in the art may be used in the method of the invention. Such curable materials include, but shall not be limited to, one or more resins, such as one or more synthetic acrylic resins, e.g. an acrylic isocyanate resin, polymethyl acrylate (PMA), polymethyl methacrylate (PMMA), etc. or one or more biopolymers, such as polylactic acid (PLA), poly-3-hydroxybutyrate, etc.

By the term "curing" is meant any method conventionally known to the person skilled for causing a material to set. Thus, the term curing may refer to thermally, e.g. heating, a material, for example, heating a resin at a temperature above the fusing temperature of the resin, visible or non-visible light setting, e.g. UV curing, etc.

According to this aspect of the present invention, there is provided a process of making a material having the appearance of leather, the process comprising:
 a) forming a stack composed of multiple layers of leaf or stem fibres, especially pineapple leaf fibres, the fibres of each layer being air laid with each other with respect to the fibres of the neighbouring layer or layers;
 b) joining the layers together, e.g. by needle punching, to form an interconnected nonwoven mat;
 c) applying a flexible hydrophilic resin, e.g. an acrylic isocyanate resin, to the surface of the mat, and pressing and curing the resin at a temperature above the fusing temperature of the fusing fibre;
 d) applying on one or more steps a flexible hydrophilic resin, e.g. an acrylic resin, containing a pigment to the surface of the mat, and curing the resin to produce a web; and
 e) tumbling the web.

Prior to applying a flexible hydrophilic resin to the nonwoven mat, the process as hereinbefore described may optionally include the step of applying one or more nets to the mat.

Leaf/stem fibres comprising the leaves/stems of one or more plants of the Bromeliaceae family, such as, *Ananas Comosus* (Linn), pineapple (PALF—pineapple leaf fibre) may also be used as a reinforcement in thermoplastic and thermosetting resins for developing low cost and lightweight composites.

It will be understood by the person skilled in the art that any of the known pineapple cultivars may be used in the materials or processes of the present invention. The pineapple, *Ananas comosus*, has several cultivars and other subspecies taxa. Here they are pomologicaly (by fruit characteristics) sorted into 3 groups:

Spanish group—is a group which can be recognized by white flesh and leaves with spines on the edge
  Red Spanish
  Singapur Spanish
  Sugar Loaf
Queen group—they can be recognized by yellow and/or golden yellow flesh and leaves with spines on the border
  Abacachi
  Cabazoni
  Pernambuco
  Queen
  Victoria
Cayenne group—can by recognized by yellow flesh and leaves without spines on the borders
  Baronne Rothschild
  Cayenne
    Hilo
  Monte Lirio The nonwoven material and/or the artificial leather of the invention may comprise a single source of leaf fibre or a composite of leaf fibres or a composite of one or more leaf fibre and one or more stem fibres.

A preferred leaf fibre comprises the leaves of one or more plants of the Bromeliaceae family, such as, *Ananas Comosus* (Linn), e.g. PALF. Alternatively, fibres such as abaca or sisal (*Agave sisalana*) may be used either alone or as a composite with PALF. Abaca fibres are leaf fibres from banana plants, such as, *Musa acuminata* or *Musa balbisiana*, etc.

When a stem fibre is included in the composite, a variety of conventionally known stem fibres may be used, for example, flax, jute, ramie and hemp.

Thus, the material of the invention may be useful for a variety of purposes, including, but not limited to, artificial leather (as hereinbefore described) and the like.

Thus, according to one aspect of the invention there is provided the use of a material as hereinbefore described in the manufacture of an artificial leather.

By the term leather substitute is meant a material with the appearance, texture, flexibility, feel, etc., that would be expected with natural leather.

As hereinbefore described, the manufacture of the natural nonwoven material according to the present invention desirably utilises leaf and/or stem fibres that have been degummed. Chemical processes of degumming are known in the art. Chemical products have been used for the conventional degumming process of PALF. More precisely, Conventional degumming has been made using sodium hydroxide (NaOH).

However, the present invention also provides a novel process of enzyme degumming of leaf and/or stem fibres.

For the enzymatic treatment, various enzymes types may be used, such as a biopectinase (a complex of polygalacturonase, pectinesterase, pectinic lyase and hemicellulase), a pectinase, a hemicellulase and a cellulase. Those enzymes have been used combined are alone in order to determine the best degumming formulation. The biopectinase is able to dissolve pectin, hemicellulosic and others materials. Pectinase, hemicellulase and cellulase enzymes can dissolve pectin, hemicelluloses and cellulose materials, respectively. Cellulase enzyme is well known for the polishing of fibrils in the surface of cotton fabrics. However, according to the state of the art, cellulase is not commonly used for fibres treatment has it can degrade fibres and reduce its resistance. In this study, cellulase has been used in low quantity as an additive to the enzymatic process.

Thus, according to a further aspect of the present invention there is provided a method of enzyme degumming leaf and/or stem fibres which comprises treating the leaf and/or stem fibres with one or more enzymes selected from the group consisting of polygalacturonase, pectinesterase, pectinic lyase, hemicellulase, pectinase and cellulase, and mixtures thereof. When a mixture of enzymes is used in degumming they may be used simultaneously, sequentially or separately. Preferably, the enzymes are used simultaneously.

A preferred group of enzymes which may be mentioned are consisting of polygalacturonase, pectinesterase, pectinic lyase and hemicellulase, and mixtures thereof. Specific mixtures which may be mentioned include a mixture of polygalacturonase, pectinesterase, pectinic lyase and hemicellulase (Biopectinase) and a mixture of polygalacturonase and hemicellulase. An especially preferred enzyme is a mixture of polygalacturonase and hemicellulase.

When a mixture of polygalacturonase and hemicellulase is used the mixture may comprise from 1% to 10% w/w polygalacturonase and from 0.5% to 2% w/w hemicellulase, e.g. a mixture of 5% polygalacturonase and 1% hemicellulase.

The amount of enzymes may vary depending upon, inter alia, the nature of the leaf and/or stem fibre being degummed.

The invention will now be described by way of example only and with reference to the accompanying figures in which FIG. 1 is a schematic representation of plasma treatment;

FIG. 1 is a representation of Ugolini equipment and solution containers;

FIGS. 3*a* to *e* are photographs of the dried fibres; and

Figure 5:
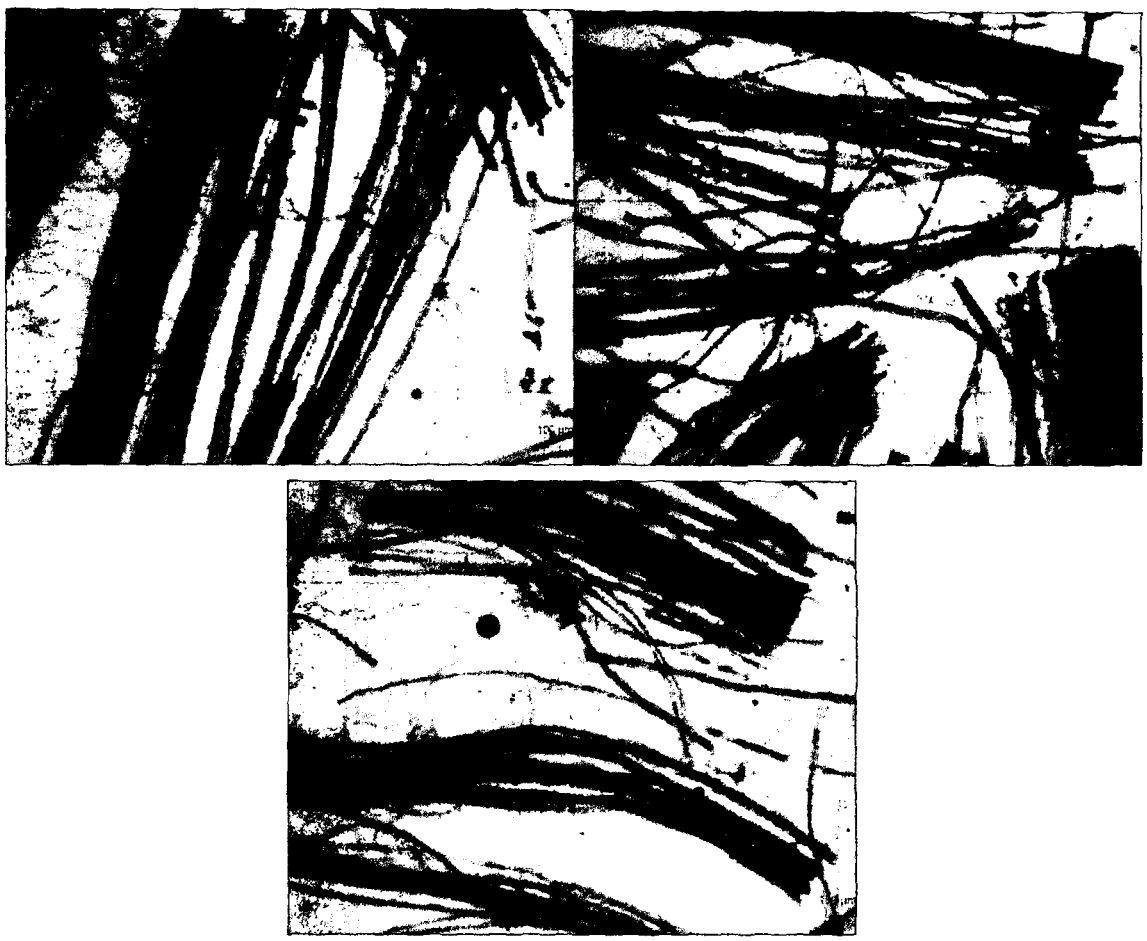
Figure 6:
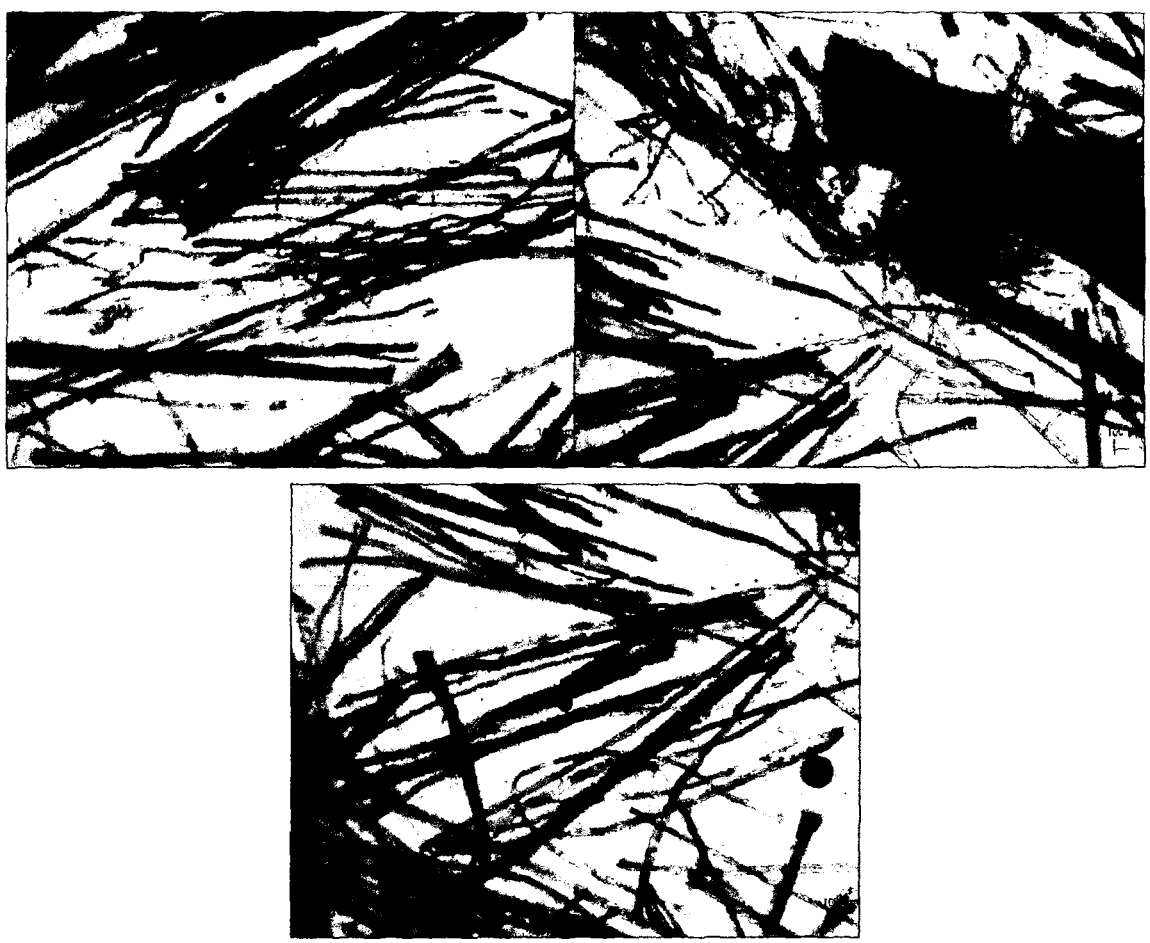
Figure 7:
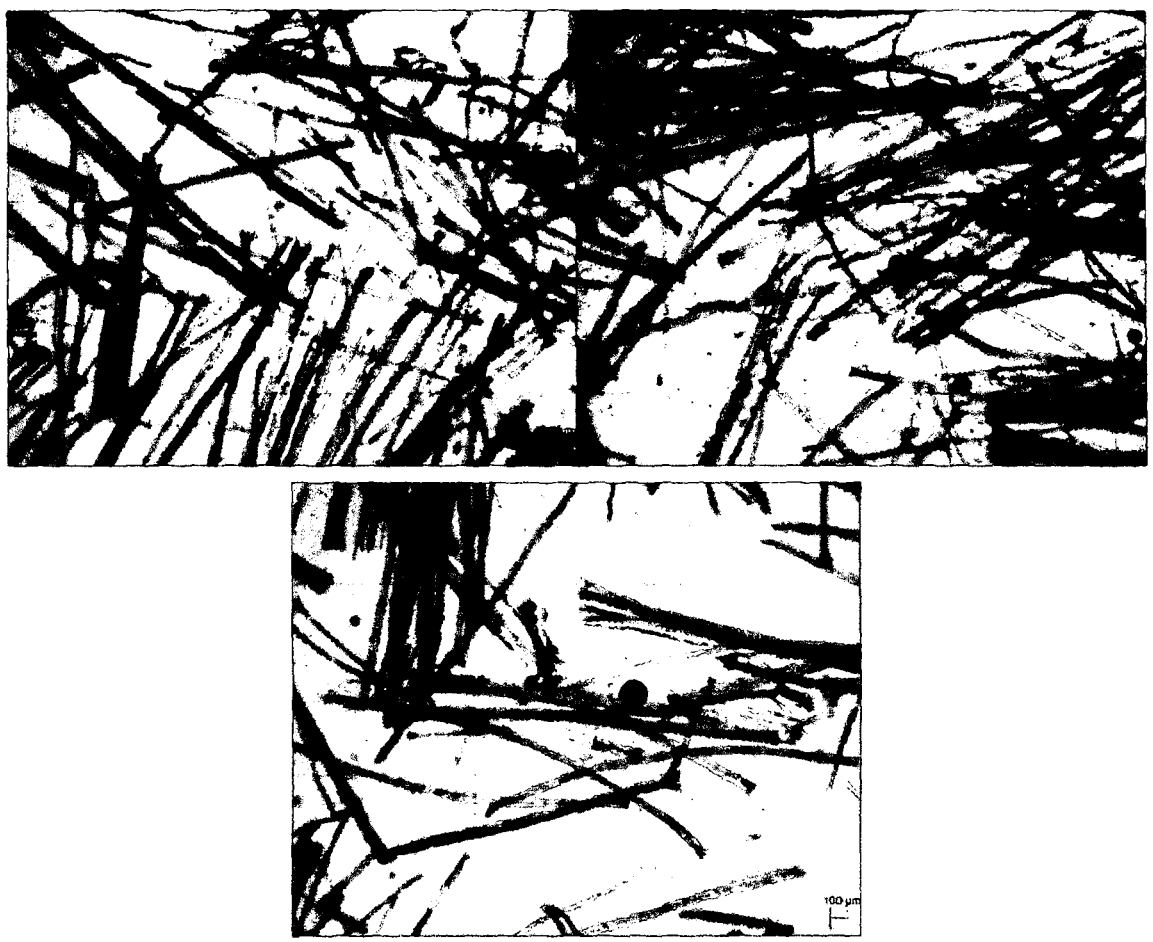
Figure 8:
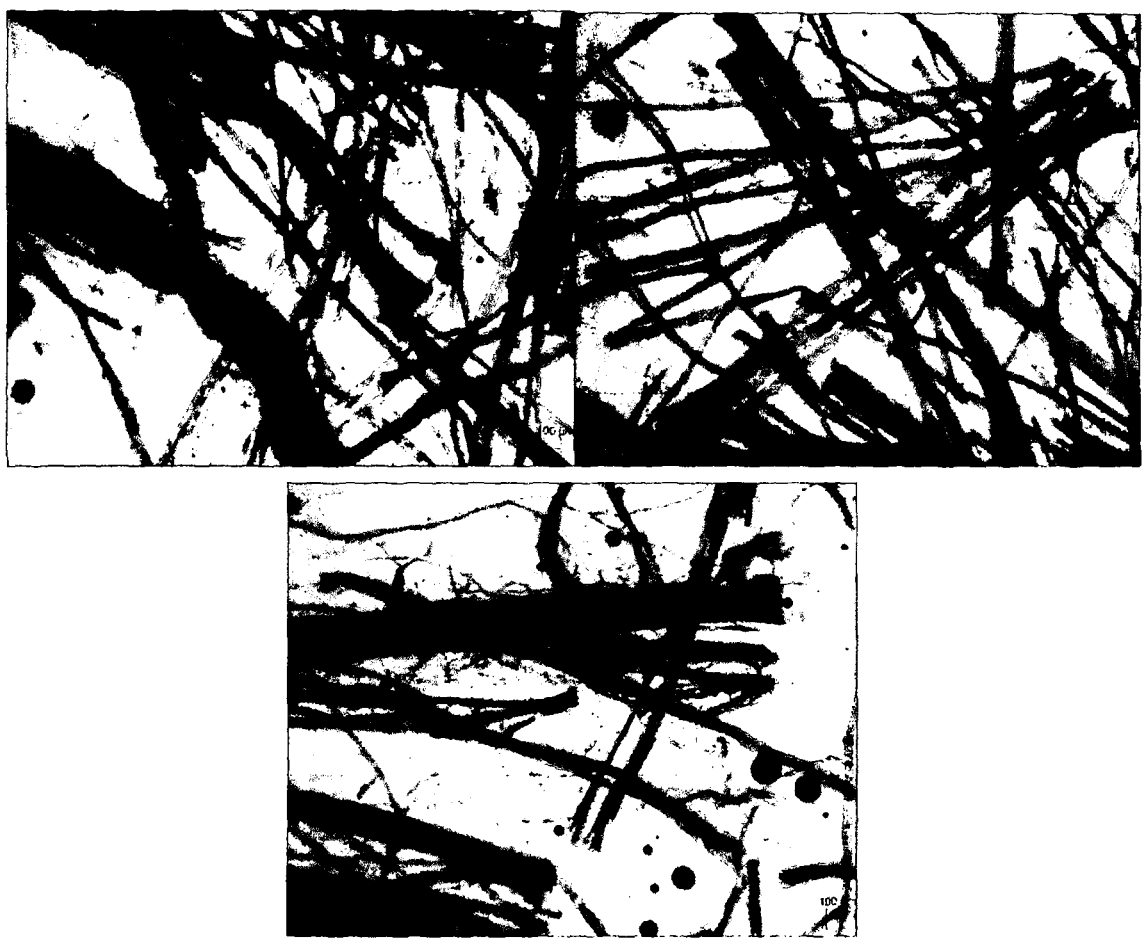
Figure 9:

FIGS. 4 to 9 are microimages of the fibres after degumming.

All percentages are given by weight, unless stated otherwise.

DETAILED DISCLOSURE

The main component of the material is leaf or stem fibres, especially pineapple leaf fibre (PALF). PALF is a vegetable based fibre extracted from the leaves of the plant *Ananas Comosus* (Linn) from the Bromeliaceae family by decorticating either manually or using mechanical methods. The main chemical constituents of pineapple leaf fibres are cellulose (75-90%), lignin (2-5%) and ash (1.1%).

The physical and mechanical properties of certain leaf fibres, e.g. pineapple, abaca and banana are shown below in Tables II, III and IV.

TABLE II

| PROPERTIES | PINEAPPLE | | ABACA | | BANANA | |
| --- | --- | --- | --- | --- | --- | --- |
| | RAW | TREATED | RAW | TREATED | RAW | TREATED |
| 1. Tensile strength, kg/gm/m | 24.97 | 16.33 | 40.80 | 31.58 | 20.90 | 25.71 |
| 2. Fineness (Denier) | 21.54 | 17.45 | 98.50 | 22.70 | 48.80 | 43.05 |
| 3. Residual Gum, % | 35.04 | 7.69 | 28.70 | 6.40 | 41.90 | 10.29 |
| 4. Moisture Content, % | 9.31 | 7.86 | 10.80 | 8.24 | 9.70 | 9.79 |
| 5. Hot Water Extractives | 5.52 | 3.64 | 2.86 | 1.02 | 16.45 | 11.49 |
| 6. Cold Water Extractives | 5.36 | 0.65 | 1.45 | 0.47 | 14.21 | 8.27 |
| 7. Alcol-Ben Extractives, % | 1.95 | 1.33 | 1.70 | 0.35 | 1.70 | 1.40 |
| 8. Total cellulose, % | 75.44 | 95.97 | 68.50 | 86.11 | 56.44 | 89.98 |
| 9. Alpha Cellulose, % | 56.09 | 87.33 | 54.50 | 63.27 | 49.53 | 54.23 |
| 10. Lignin, % | 4.31 | 2.50 | 8.70 | 3.23 | 13.22 | 3.86 |
| 11. Ultimate Cell Length(mm) | 5.00 | — | 3.00 | — | 3.50 | — |
| 12. Ultimate Cell Diameter(mm-3) | 8.00 | — | 20.00 | — | 25.00 | — |

TABLE III

Physical and Mechanical Properties of Pineapple Leaf Fibre (PALF)

| PROPERTIES | VALUE |
| --- | --- |
| Density (g/cm3) | 1526 |
| Softening Point (C.) | 104 |
| Tensile Strength (MPa) | 170 |
| Young's Modulus (MPa) | 6260 |
| Specific Modulus (MPa) | 4070 |
| Elongation at Break (%) | 3 |
| Moisture Regain (%) | 12 |

TABLE IV

| Chemical Constituents | % Composition |
| --- | --- |
| Total cellulose | 87.56 |
| Alpha-Cellulose | 78.11 |
| Hemicellulose | 9.45 |
| Lignin | 4.78 |

(From SITRA-University Technology Malaysia)
American Standard Testing & Materials International (ASTM) 2003

The superior mechanical properties of pineapple leaf fibres are associated with their high cellulose content. They are relatively inexpensive, and abundantly available. PALF is a strong fibre with silky appearance. The outer, long leaves are preferred. PALF are usually left on the ground after the pineapple fruit is harvested. Other leaf or stem fibres that can be used are sisal, banana leaf fibre, hemp and flax fibre.

PALF is extracted from pineapple leaves, once the pineapple fruit has been cut from the plant. The leaves are decorticated where leaves are crushed and beaten by a rotating wheel set with blunt knives, so that only fibres remain. The fibre is then dried, brushed and collected in hunks. The length of PALF at this stage has an average of 70/100 cm long.

The fibres are 'cleaned' by removing unwanted gum/tissue to form separate fibres. For chemical degumming the conventional process consisted in an aqueous solution of sodium hydroxide. More precisely, 2% o.w.f has been dissolved in distilled water. A liquor ratio 1:25 has been used. PALF samples have been treated in the chemical formulation during 10 to 40 minutes, e.g. 30 minutes, at 60° C. to 90° C., e.g. 80° C. Then, treated samples have been rinsed in distilled water and have been dried at room temperature.

The fibres are washed and rinsed and then loaded into a vertical vacuum tank, with chemicals dissolved in water and added to the tank. This degumming liquor is aqueous solution of sodium hydroxide and ammonia. Soaking takes from 2 to 6 hours depending on how much gum should be retained by the fibres. Softening agents are then added, then the fibres are rinsed in water and sun dried.

The above procedure is a standard chemical process for degumming fibres. Alternatively, the degumming procedure may comprise enzyme degumming as described herein.

In the present invention, for the purpose of forming a nonwoven material, the optimum length of the fibres was found to be about 2-12 cm, e.g. 4-10 cm, especially about 6 cm to provide good overall mechanical properties in the finished material while allowing easy handling and processing. Fibres are cut to the desired length by a standard cutting machine.

From about 80 to 100% w/w of the nonwoven mesh is made up of PALF. The rest, from about 0 to 20% w/w, is made up of a fusible polymer, e.g. a polyester, fibres, approximately 5 cm in length. This is used as the melting fibre or binder in the nonwoven mesh. A mixture of the above cut fibres are air laid with an "Air-Laying Machine" suitable for the production of air laid nonwovens. A mat is made by stacking two or more air laid layers, total weight of from about 100 to about 2000 gpsm, e.g. 400 gpsm. This is achieved on a standard air laying machine in which fibres are fed into the machine and carded; this is followed by air laying. The layers are mechanically bonded, e.g. by needle punching.

Needle punched nonwovens are created by mechanically orienting and interlocking the fibres of a spun bonded or carded web. This mechanical interlocking is achieved with thousands of barbed felting needles repeatedly passing into and out of the web.

As mentioned above, about 80 to 100% w/w of the nonwoven mesh is made up of PALF, with the any balance being a fusible polymer, e.g. a polyester, which is used as a melting fibre or binder in the nonwoven mesh. The resulting nonwoven has a density of from about 100 to about 2000 gpsm, e.g. from about 200 to 400 g/m$^2$ and is from about 0.5 mm to about 15 mm thick, e.g. from about 2.5 mm to about 3 mm thick. It is, for example, wound into rolls 2.15 m wide by 50 m long.

The nonwoven mesh or mat having a weight of for example, from about 100 to about 400 g/m$^2$, was finished to form an artificial material using one or more of the following process steps:

The nonwoven materials are advantageous because, inter alia, they take colour very well and are compatible with the resins and finishings used. In addition it is biodegradable and does not use toxic and polluting tanning chemicals and so is more socially responsible than leather. It can be used as a substitute material in making, for example, fashion accessories, furnishings, clothing, home interiors panels, bags, luggage, the car industry, shoes, etc.

1. Heat Set of Nonwoven Mat:

The compaction is useful in obtaining grater basis weight or GPSM (grams per square meter) and density, more bulk, higher strength and improves the adhesive properties.

The mat was pressed at a temperature of 90° C. to 200° C. for 1 to 30 seconds, e.g. 120° C. for 30 seconds, at a pressure of 1 to 4 kg/cm$^2$. At this temperature, the fusible polymer, e.g. a polyester, melted and fused the PALF fibres together.

2. Laminated with Mesh:

A co-polymer, polymer and/or bio-polymer mesh is applied on one or two sides of nonwoven PALF by the application of temperature, e.g. from about 90° C. to about 200° C., and pressure, e.g. from about 1 to about 4 kg/cm$^2$. The mesh is designed not to peel away from the nonwoven fabric.

This process is optional according to the properties that are desired to give to the material. The properties that it provides not are essential to obtain the final material/fabric.

3. Chemical Treatments

PALF nonwovens are finished with various chemicals in order to obtain the specific property depending on end-use. Different chemical finishes are discussed below.

Four methods or treatments are described and valid to obtain different finishing in the PALF non woven 3.1 First Way. by Transfer Paper A transfer paper coated with a finishing resin composition:

Was used to transfer the resin onto the surface of the non woven mat using a calendaring machine, with a thick blade to apply the composition. The paper was not removed at this stage. The composition penetrated into the nonwoven mat.

Composition 3.1.1

| | |
|---|---|
| 100% water based acrylic, soft (standard), e.g. polyurethane PKA | 90% to 97% |
| Antifoaming agent, e.g. BG-Print ASF - BGH | 0.1% to 0.3% |
| Thickener e.g. Cresaclear TE | 1.2% to 1.8% |
| Isocyanate Bayhydur XP 2655 - Bayer | 1.6% to 2.3% |
| Other auxiliary chemicals, e.g. extra finishes, thickener, pigment, metallic powder, etc. | 0% to 4% |

The resulting coated mat was then dried and cured in a press under heat and pressure (with the transfer paper in situ) at a temperature of 90° C. to 150° C., and a pressure: of 1 kg/cm$^2$ to 4 kg/cm$^2$, for 1 to 30 seconds, e.g. 120° C. at 1.5 kg/cm$^2$ to 2 kg/cm$^2$ for 10 seconds or 150° C. for 60 seconds.

Composition 3.1.2

| | |
|---|---|
| 100% water based acrylic, soft (standard) | 96.43% |
| antifoaming agent (BG-Print ASF" - BGH Spain) | 0.19% |
| Thickener ("Cresaclear TE" - Cresa) | 1.45% |
| Isocyanate (Bayhydur XP 2655 - Bayer) | 1.93% |

3.2 Second Way, by Immersion or Wet Processes

Dyeing of PALF nonwoven; dyes and pigments can be added as a concentrate. These processes are referred to as producer colouration or melt dyeing.

3.2.1 Resin and Dyeing by Foulard Machine

Resin was applied to the mat on a Foulard (2 horizontal rollers with pressure: laboratory foulard). The composition penetrated into the mat.

A composition with Formulation A

| | |
|---|---|
| Water | 50% to 90% |
| Antifoaming agent, e.g. BG-Print ASF - BGH | 0.1% to 0.4% |
| 100% water based soft acrylic, polyurethane, latex, silicone or bio-reins (standard) | 9% to 30% |
| Antimigrating agent, e.g. Migravit TCP | 2.5% to 4.0% |

The mat was dried and polymerised at a temperature of 120 to 160° C. for 1 to 5 minutes, e.g. 120° C. for 2 minutes, depending upon the resin morphology.

3.2.2 Resin and Dyeing Machine

This process will be carried out with only one step in the same bath of dyeing. This method has it as purpose to use the resin in the process of dyeing in one step.

The prepared solution will add colour to the PALF nonwoven and besides will provide with the finished resin.

| | |
|---|---|
| Water | 50% to 90% |
| Antifoaming agent, e.g. BG-Print ASF - BGH | 0.1% to 0.4% |
| 100% water based soft acrylic, polyurethane, latex, silicone or bio-reins (standard), e.g. polyurethane PKA | 9% to 30% |
| Antimigrating agent, e.g. Migravit TPC | 2.5% to 4.0% |
| Synthetic or organic pigment, e.g. blue S-RRR | 1% to 10% |
| Sodium sulphate and carbonate sodium | 0% to 8% |

The mat was dried and polymerized at a temperature of 120 to 160° C. for 1-5 minutes. The temperature will depend upon the resin morphology, and the need to eliminate water.

3.3 Third Way, Surface Coating Treatment

This methodology is based on the accomplishment of a cover or coating that provides resin and colour to the PALF nonwoven mat. After this treatment the nonwoven mat remains compacted and is coloured.

This treatment is carried out using a coating process. This coating can be obtained through adequate equipment or machinery, e.g. screen printing, calendaring, etc., to cover the PALF nonwoven and the viscosity of the formulation employed. The used formulation 3.3.1:

| | |
|---|---|
| 100% water based soft acrylic, polyurethane, latex, silicone or bio-reins (standard) | 85% to 95% |
| Antifoaming agent, e.g. BG-Print ASF-BGH | 0.1% to 0.4% |
| Thickener, e.g. Cresaclear TE | 1% to 10% |
| Isocyanate, e.g. Bayhydur XP 2655-Bayer | 1% to 2.5% |
| Synthetic or organic colour pigment | 0% to 10% |

The mat was then dried at a temperature of 150 to 160° C. for 1 to 5 minutes, e.g. 150° C. for 1 minute.

This process of coating and polymerising can be repeated several times until the correct consistency is achieved for the present application.

3.4 Fourth Way, Spraying Method

This process will be carried out if it is necessary as a continuation of the processes described previously. 3.2.1 and 3.2

The treatment provides colour, the surface/side is treated by spraying. The purpose is to obtain two colours differentiated on both sides of the nonwoven. More than one coating may be applied. The treatment is carried out applying a liquid formulation that provides the colour.

| | |
|---|---|
| Water | 60% to 80% |
| 100% water based soft acrylic, polyurethane, latex, silicone or bio-reins (standard) | 10% to 30% |
| Isocyanate | 0 to 5%, e.g. 1% to 2.5% |
| Synthetic or organic colour pigment | 1% to 10% |

The nonwoven mat was then dried at a temperature of 120 to 160° C. for 1 to 5 minute, e.g. 150° C. for 1 minute.

4. Finishing Processes

Different finishes may be applied to the nonwoven mat. Some methods are used to improve the surface characteristics of the PALF nonwoven mat. Nonwovens are finished with various chemicals in order to obtain the specific property depending on end-use. Different chemical finishes are discussed below.

4.1 Water Repellents

Water repellent finishes are a type of barrier, which function to lower the critical surface tension of the fibre surface. To be most effective it is important that the fibres are treated evenly on all surfaces to give the lowest critical surface tension possible. Water repellence can be achieved with a variety of chemical finishes such as waxes, wax dispersions, melamine wax extenders, chrome complexes, silicones, and fluorochemicals. The finishes require curing to develop the best repellence.

4.2 Plasma Treatment

Also a Plasma treatment may be used to confer several properties, e.g. extra strength, surface finishing, etc. on the surface of nonwoven mat.

Plasma treatment will be used to confer several properties of finished on the surface of nonwoven mat. Plasma treatment comprises treatment with an ionised gas (e.g. from a glow-discharge) with an essentially equal density of positive and negative charges. The ionised gas can exist over an extremely wide range of temperatures and pressures. According to requirements the materials to be processed (PALF nonwoven), will be treated for seconds or some minutes with plasma. Essentially four main effects can be obtained depending on the treatment conditions.

- The cleaning effect is mostly combined with charges in the wettability and the surface texture. This leads for example to increase of quality printing, painting, dye-uptake, adhesion and so forth.
- Generation of radicals. The presence of free radicals induces secondary reactions like cross linking. Furthermore, graft polymerization can be carried out as well as reaction with oxygen to generate hydrophilic surface.
- Plasma polymerization. It enables to deposition of solid polymeric materials with desired properties onto the substrates.
- Increase of microroughness. This effects, for example, an anti-pilling finishing of wool.

The advantage of such a treatment is that the modification is restricted to the uppermost layers of the substrate, thus not affecting the overall desirable bulk properties of the substrate adherent

4.3 Leather Finish

The methods used are continuous and usually involve one or several pairs of rollers operating under pressure.

The calenders are common in nonwoven finishing. The embossing effect is used to obtain special effects such as leather graining or texturised leather like.

A calendaring machine, with a thick blade was used to apply a commercially available leather finishing, e.g. a standard formulation. The nonwoven mat was then dried by a mechanical tumbling at a temperature of 150° C. to 160° C. for 1 to 5 minutes.

A calendaring machine, with a thick blade was used to apply a commercially available leather finishing formulation Astacin Finish PFM TF from BASF The mat was then dried at a temperature of 160° C. for 1 minute.

4.4 Thermoplastic Binders, Resins and Emulsion Polymers

Binders and resins are widely used in the finishing of nonwovens to add strength, control stiffness, add moldability or pleatability, provide durable flame retardants, colour, reduce linting and control shrinkage. They soften when exposed to heat and return to their original state when cooled and, hence, can be set. Emulsion polymers are also called latexes. The common binders, resins and polymers include acrylics, PVC, polyacrylic acid, urethanes, starch, vinyl acetate etc.

4.5. Tumbling (Mechanical Finishes)

This process provides softness and handling into the nonwoven fabric after finishing The process reduces the rigidity of the PALF nonwoven as a result the previous treatments.

This finish mainly provides smoothness and a tactile feel.

These are mechanical processes that can be carried out with different methodologies and equipment: Vacuum tumbling machine, cylinder or calender tumbling machine and/or hand tumbling, to provide the desired tactile feel and softness.

5. Degumming

5.1. Exhaust Process Description

Samples were processed in Ugolini exhaustion equipment. During treatment, the fibres are exhausted in the solution at a velocity of 40 rpm and determined temperature and time (according to supplier information). The fibres are placed inside a small container of 300 ml capacity. The container is completely filled with the enzymatic solution so the fibres can be well impregnated into the bath. The Ugolini equipment is described in FIG. 2.

5.2. Enzymatic Processes Description

Various processes have been realized in order to determine the best enzymatic formulation. Temperature and pH parameters have been kept constant according to the technical information of the supplier. Enzyme formulation, enzyme concentration, and process time parameters have been varied.

Five enzymes formulations have been developed. Biopectinase and polygalacturonase enzymes will be used alone. Then, polygalacturonase will be associated to hemicellulase and cellulase enzymes to observe their effect on the degumming of the fibre. Biopectinase M01 will be associated to cellulase for the same reasons. However, Biopectinase will not be associated to hemicellulase as it is already composed of this material. The following table 1 presents the different materials used in this study and table 2 presents different combination of enzymes made:

TABLE 1

Materials description

| Product | Composition | Activity (U/ml) | Supplier |
|---|---|---|---|
| Biopectinase M01 | Polygalacturonase, | 60 000 | Biocon Española |

TABLE 1-continued

Materials description

| Product | Composition | Activity (U/ml) | Supplier |
|---|---|---|---|
| Polygalacturonase | pectinesterase, pectinic lyase and hemicellulase. Pectinase | 11 000 +/− 5% | Biocon Española |
| Xylanase | Hemicellulase | 36 000 − 5% + 10% | Biocon Española |
| Biosoft L | Cellulase | 50 000 | Biocon Española |

TABLE 2

Enzymes combination description

| Reference | Enzyme combination | Description |
|---|---|---|
| E1 | Biopectinase M01 | Enzyme complex |
| E2 | Biopectinase M01 + Biosoft L | Enzyme complex + cellulase |
| E3 | Polygalacturonase | Pectinase |
| E4 | Polygalacturonase + Xylanase | Pectinase + hemicellulase |
| E5 | Polyglacturonase + Xylanase + Biosoft L | Pectinase + hemicellulase + cellulase |

Temperature and pH values of each bath have been determined according to the optimum temperature and pH of each enzyme. For example, best activity of polygalacturonase, xylanase and Biosoft L is located at pH 3-5.5, pH 4-7 and acidic pH, respectively. So, optimum pH formulation has been fixed to 5. So, Biopectinase M01 temperature and pH applied values were 40° C. and 4.25, respectively, when Polygalacturonase temperature and pH applied values were 50° C. and 5, respectively.

The following table 3 present the formulation of the enzymatic baths. Liquor ratio has been kept constant to 1:40.

TABLE 3

Baths formulation

| Bath number | Enzyme reference | Enzyme concentration o.w.f. (*) | pH | Process temperature (° C.) | Process time (hours) | Sample reference (**) | Activity Polygalacturonase (U/ml) |
|---|---|---|---|---|---|---|---|
| Bath no 1 | E1 | 14.6% biopectinase | 4.25 | 40 | 2, 4 and 6 | B1 2, B1 4, B1 6 | 5.5 |
| Bath no 2 | E1 | 36.7% biopectinase | 4.25 | 40 | 2, 4 and 6 | B2 2, B2 4, B2 6 | 13.8 |
| Bath no 3 | E2 | 14.6% biopectinase + 1% cellulase | 4.25 | 40 | 2, 4 and 6 | B3 2, B3 4, B3 6 | 5.5 |
| Bath no 4 | E2 | 36.7% biopectinase + 1% cellulase | 4.25 | 40 | 2, 4 and 6 | B4 2, B4 4, B4 6 | 13.8 |
| Bath no 5 | E3 | 2% polygalacturonase | 5 | 50 | 2, 4 and 6 | B5 2, B5 4, B5 6 | 5.5 |
| Bath no 6 | E3 | 5% polygalacturonase | 5 | 50 | 2, 4 and 6 | B6 2, B6 4, B6 6 | 13.8 |
| Bath no 7 | E4 | 2% polygalacturonase + 1% xylanase | 5 | 50 | 2, 4 and 6 | B7 2, B7 4, B7 6 | 5.5 |
| Bath no 8 | E4 | 5% polygalacturonase + 1% xylanase | 5 | 50 | 2, 4 and 6 | B8 2, B8 4, B8 6 | 13.8 |
| Bath no 9 | E5 | 2% polygalacturonase + 1% xylanase + 1% cellulase | 5 | 50 | 2, 4 and 6 | B9 2, B9 4, B9 6 | 5.5 |
| Bath no 10 | E5 | 5% polygalacturonase + 1% xylanase + 1% cellulase | 5 | 50 | 2, 4 and 6 | B10 2, B104, B10 6 | 13.8 |

It was observed that the enzymatic bath was transparent before treatment and yellowish after treatment. This means that the fibre has been cleaned from its pectic material which is present in the bath. In the case of the conventional process, the colour of the bath was more intense (it turned to orange) but the fibres were less cleaned, rougher and have yellow colour. Also, we observe short (4 mm) parts of chemically treated fibres in the bath after rinsing. This last observation shows that fibres have been damaged by the chemical process.

5.3. Enzymatic Process Optimization

As we observed in the visual analysis, most of best results have been obtained at the longest time process, i.e. at 6 hours. So, the process time will be increased in the optimisation of the processes. Also, best results have been obtained at 5% o.w.f of enzyme. Enzyme concentration hasn't been increased as these products have an optimum activity at a determined concentration and this activity could decrease after 5%.

Process optimization consisted of increasing the process time from 6 hours to 8 hours. Moreover, all enzymes have been used at 5% o.w.f. Process temperature has been adjusted to 45° C. which is optimum temperature for most enzyme activity. The following table 4 presents the optimised baths formulation.

TABLE 4

Optimised baths formulation

| Bath number | Enzyme reference | Enzyme concentration (o.w.f) | Solution pH | Process temperature | Process time | Sample reference | Activity Polygalacturonase (U/ml) |
|---|---|---|---|---|---|---|---|
| Bath no 11 | E1 | 36.7% biopectinase | 4.25 | 45° C. | 8 hours | B11 8 | 16.5 |
| Bath no 12 | E2 | 36.7% biopectinase + 1% cellulase | 4.25 | 45° C. | 8 hours | B12 8 | 16.5 |
| Bath no 13 | E4 | 5% polygalacturonase + 1% hemicellulase | 5 | 45° C. | 8 hours | B13 8 | 16.5 |
| Bath no 14 | E5 | 5% polygalacturonase + 1% hemicellulase + 1% cellulase | 5 | 45° C. | 8 hours | B14 8 | 16.5 |

Process Observations:

It was observed that bath n°12 and bath n°14 present short broken fibres inside. Bath n°14 present more quantities of broken fibres than bath n°12. So, after analysing the composition of baths n°12 and 14, we can conclude that cellulase enzyme is responsible for the breaking of fibres. Moreover, the presence of hemicellulase increases the degradation of the fibres.

Samples Presentation:

After drying of the samples, they have been separated manually for their characterization. Indeed, the fibres have rough appearance after drying but once they are opened they become softer than before. At industrial stage, the manual opening should be done by means of an opener (conventional textile equipment). The optimised samples are represented in FIGS. 3 a to e.

As can be seen in the figures, non treated and conventional samples have yellowish colour. Enzymatic treatment improved the aspect of the fibres giving them a white colour. It was observed on last figure that polygalacturonase, hemicellulase and cellulase treated fibres (B14 8) was more damaged than the others. All fibres (conventional and enzymatic process) present a rough touch after treatment. Indeed, the treatments eliminate the waxes and other components on the surface of the fibres which provide them a soft touch. After opening process, fibres are softer than before. No softening agent has been used for environment issues.

No-treated, conventionally treated and enzymatic treated fibres have been characterized by measuring their length, their tensile strength and by observing them in a microscope. The obtained results are resented in this part.

5.4. Fibre Length

Length of the fibres has been determined using standard UNE 40152:1984. Samples have been conditioned 24 hours at 20° C.±2° C. and 65%±5% h.r. (relative humidity). The conditions of the measurements are presented in the following table 5:

TABLE 5

Conditions of the essay

| | |
|---|---|
| Essay atmosphere: | 22° C. (20° C. ± 2° C.)-60% (65% ± 5% h.r.) |
| Number of measurements (for each sample): | between 100-300 |
| Previous treatment: | Not applicable |

The following table 6 present the results obtained for the each sample:

TABLE 6

Length measurements results

| Sample | Average length (cm) | Coefficient of variation (%) | Maximum length (cm) |
|---|---|---|---|
| Not treated | 75 | 6.7 | 85 |
| B11 8 | 62 | 22.2 | 80 |
| B12 8 | 52 | 20.0 | 70 |
| B13 8 | 69 | 15.2 | 90 |
| B14 8 | 41 | 15.0 | 55 |
| Conventional | 41 | 32.2 | 70 |

Observations:

No treated sample has the highest fibres' length. After treatment fibres' length of all samples has been reduced. We observed that sample B14 8 and conventionally treated fibres present the highest decrease of length. This result could be due to the aggressive action of chemicals (NaOH) and cellulase enzyme combined with hemicellulase. Sample B12 8, also treated with cellulase, present short fibres' length. After no treated sample, sample which has higher fibre length is sample B13 8, corresponding to fibres treated with polygalacturonase and hemicellulase.

5.5. Fibre Fineness

Fibres' fineness and title have been determined using the microscope ZEISS Axioplan, a camera and the programme of analysis DeltaPix 300. The test consists of extracting the shortest fibres from the sample, observe them with the microscope with transmitted light and take a picture of them at ×25. Then, the program measures the fineness and the title of about 150 fibres.

The following table 7 present the obtained fineness and title of the fibres.

TABLE 7

Fineness measurements results

| Sample | Average fineness (μm) | Minimum fineness (μm) | Maximum fineness (μm) | CV (%) | Average fibre title (dTex) |
|---|---|---|---|---|---|
| Not treated | 75 | 21 | 393 | 59.8 | 68 |
| B11 8 | 80 | 29 | 597 | 84.6 | 78 |
| B12 8 | 63 | 25 | 165 | 38.9 | 48 |
| B13 8 | 71 | 30 | 176 | 41.1 | 60 |
| B14 8 | 71 | 18 | 224 | 44.8 | 61 |
| Conventional | 60 | 28 | 150 | 33.3 | 43 |

Observation:

Table 7 shows that results present a high coefficient of variation value. This is due to irregularities in the fineness of the fibres. For example, sample B11 8 has a higher diameter than not treated sample. This could be due to the union produced between the fibres after drying. As mentioned before, in part 0, the pectic material which links the fibres together has been hydrolysed but fibres keep being united. This physical union could be eliminated by means of an opening machine.

Conventional sample present the best results and the lowest coefficient of variation. These results show that conventional process is more efficient in for separating the fibres although it could damage them. After conventional sample, best results have been obtained with sample B12 8 treated with biopectinase and cellulase enzymes.

5.6. Microscopic Inspection

Microscopic inspection has been determined using Microscope ZEISS Axioplan and the program DeltaPix 300. Longitudinal sections of each sample have been made and they have been observed through a microscope with an image magnification of ×12.5. Samples have been observed with transmitted light. The following images have been taken of each sample:

Not Treated Sample

Micro images of more significant zones of the sample. We observe the presence of fibrils detached from the fibres depicted in FIG. 4.

Conventional Sample

Micro images of more significant zones of the sample. We observe the presence of fibrils detached from the fibres. In this case, we observed highest quantity of detached fibrils depicted in FIG. 5.

Sample B11 8

Micro images of more significant zones of the sample. We observe the presence of fibrils detached from the fibres depicted in FIG. 6.

Sample B12 8

Micro images of more significant zones of the sample. We observe the presence of fibrils detached from the fibres. In this case, we observed less quantity of detached fibrils than in the previous cases. We also observed that the fineness and the shape of those fibres were more regular than other fibres depicted in FIG. 7.

Sample B13 8

Micro images of more significant zones of the sample. We observe the presence of fibrils detached from the fibres depicted in FIG. 8.

Sample B14 8

Micro images of more significant zones of the sample. We observe the presence of fibrils detached from the fibres. In this case, we observed less quantity of detached fibrils than in the previous cases depicted in FIG. 9.

Observation:

During the microscopic observation, we observed that the main difference between the samples is the damage represented by the presence of filament detached from the fibres. The formation of these fibrils can be due to phenomena of abrasion or chemical action. Not treated sample also present fibrils, but conventional sample present more quantity of fibrils than before treatment. So, conventional treatment increases the degradation of the fibres and the formation of fibrils.

The degradation of samples B13 8, B11 8 and not treated is similar.

Samples B12 8 and B14 8 present less quantity of fibrils than other samples. Indeed, we observe high quantity of fibrils in the bath after treatment. So, we can conclude that cellulose is responsible for the elimination of the fibrils on the surface of the fibres. More precisely, cellulase polish the fibre. Moreover, cellulase is commonly used for the elimination of fibrils on the surface of cotton fabrics.

5.7. Fibre Tensile Strength

Tensile strength of the samples has been measured by means of INSTRON 5544 equipment, according to standard UNE EN ISO 5079:1996. The temperature and the humidity conditions during the test were 20.9° C. and 63%, respectively.

The results are presented in the following table 8:

TABLE 8

Samples tensile strength and elongation at break

| | Strength (cN) | CV of strength (%) | Extension at break (%) | CV of extension at break (%) | Tensile strength (cN/Tex) |
|---|---|---|---|---|---|
| Not treated | 111.56 | 44.72 | 3.62 | 51.44 | 16.41 |
| Conventional | 154.76 | 21.82 | 4.21 | 36.09 | 35.99 |
| B11 8 | 127.39 | 32.24 | 3.45 | 21.52 | 16.33 |
| B12 8 | 47.93 | 50.61 | 1.42 | 87.42 | 9.99 |
| B13 8 | 82.85 | 32.62 | 3.88 | 69.08 | 13.81 |
| B14 8 | 34.39 | 27.35 | 1.98 | 22.60 | 5.64 |

Observation:

Conventional sample presents best results, followed by not treated and B11 8 samples. Not treated sample should have the highest tensile strength as any additive products likely to weaken the fibre have been applied. However, conventional sample obtained better results than not treated sample. We suppose that the high tensile strength of conventional sample is due to the presence of fibrils which may adhere to the fibre increasing the coefficient of friction and thus adding more strength to the fibre (as we saw in microscopic inspection, fibrils are more present in this sample). Also, tensile strength of conventional fibre could have been increased by the presence of NaOH. Indeed, during the mercerisation process of cotton, the addition of more than 23% of NaOH can increase the tensile strength of the fibre.

As we can see in the table, samples which obtain lowest tensile strength are samples B12 8 and B14 8 due to the presence of cellulase enzyme in their treatment bath. Also, we can make a correlation between results obtain in microscopic inspection and obtained in tensile strength measurement. Indeed, samples with lower quantity of filaments are samples which showed lower tensile strength, i.e. Samples treated with cellulase enzyme.

After conventional sample best results are obtained with B11 8 and B13 8 samples, treated with biopectinase and polygalacturonase+hemicellulase, respectively.

CONCLUSION

Length measurements showed that chemical treatment and cellulase enzymes damage the fibres. Sample B13 8 (polygalacturonase & hemicellulase) have the longest fibres, right after no treated sample. Third best sample is B11 8 with a length of 62 cm.

Fineness measurements showed that best results have been obtained with conventional process. Fineness of conventional sample could be due to the defibrillation of the fibre. More precisely, the diameter of the fibre is lower when the fibrils are taken out. Right after conventional process, best results have been obtained with samples B12 8 (48 dTex) and B13 8 (60 dTex).

Microscopic inspection showed that conventional process damages the fibres increasing the number of superficial fibrils. On the other part, cellulase enzyme is responsible for the elimination of the fibrils of the fibres.

Tensile strength values show that best results have been obtained with conventional process. However, best enzymatic process has been obtained with samples B11 8 and B13 8. Results also showed that cellulase enzyme have an influence on the tensile strength of the fibre.

The invention claimed is:

1. A nonwoven material comprising:
a finishing resin layer; and
a multilayered stack, the multi-layered stack comprising discrete interconnected layers, each of the layers, which may be the same or different, comprising a composite fibre that is a mixture of:
(i) more than 50% w/w of air-laid enzymatically degummed leaf fibre or enzymatically degummed stem fibre or mixtures thereof which are derived from one or more plants of the Bromeliaceae family wherein said leaf or stem fibres or mixtures thereof being degummed at a temperature of about 40° C.;
(ii) from about 15 to 20% w/w of a fusible polymer, wherein the polymer is fusible at a temperature of less than 180° C.;
wherein one or more of the discrete interconnected layers is associated with the fusible polymer for use in the manufacture of a material;
(iii) wherein the multilayered stack is coated with the finishing resin layer and wherein the finishing resin layer and the fusible polymer are different;
(iv) calendering the material; and
(v) curing the curable material, wherein the cured material is the cured nonwoven material.

2. A nonwoven material according to claim 1 wherein the leaf fibres or stem fibres have a length of from about 2 to 12 cm.

3. A nonwoven material according to claim 1 wherein the fusible material is a resin.

4. A nonwoven material comprising:
a finishing resin layer; and
a multilayered stack, the multi-layered stack comprising discrete interconnected layers, each of the layers, which may be the same or different, comprising a composite fibre that is a mixture of:
(i) from about 80 to 95% w/w of air-laid enzymatically degummed leaf fibre or enzymatically degummed stem fibre or mixtures thereof said leaf or stem fibres or mixtures thereof being degummed at a temperature of about 40° C.;
(ii) from about 15 to 20% w/w of a fusible polymer, wherein the polymer is fusible at a temperature of less than 180° C.;
wherein one or more of the discrete interconnected layers is associated with the fusible polymer;
(iii) wherein the multilayered stack is coated with the finishing resin layer and wherein the finishing resin layer and the fusible polymer are different; and
(iv) calendering the material.

5. The material according to claim 4 wherein the material is an artificial leather.

6. The material according to claim 4 wherein the degummed leaf fibre or degummed stem fibre or mixtures thereof are enzymatically degummed with one or more enzymes selected from the group consisting of polygalacturonase, pectinesterase, pectinic lyase, hemicellulase, pectinase and cellulase, and mixtures thereof.

7. The material according to claim 4 wherein the degummed leaf fibre or degummed stem fibre or mixtures thereof are enzymatically degummed with one or more enzymes selected from the group consisting of polygalacturonase, pectinesterase, pectinic lyase and hemicellulase, and mixtures thereof.

8. The material according to claim 4 wherein the degummed leaf fibre or degummed stem fibre or mixtures thereof are enzymatically degummed with a mixture of polygalacturonase, pectinesterase, pectinic lyase and hemicellulase (Biopectinase) or a mixture of polygalacturonase and hemicellulase.

9. The material according to claim 4 wherein the degummed leaf fibre or degummed stem fibre or mixtures thereof are enzymatically degummed with a mixture of polygalacturonase and hemicellulase.

10. A nonwoven material comprising
a finishing resin layer; and
a multilayered stack, the multilayered stack comprising discrete interconnected layers, each of the layers, which may be the same or different, comprising a composite fibre which is a mixture of:
(i) from about 80 to 95% w/w of air-laid enzymatically degummed leaf fibre or enzymatically degummed stem fibre or mixtures thereof; said leaf or stem fibres or mixtures thereof being degummed at an acidic pH;
(ii) from about 5 to 20% w/w of a polymer, wherein the polymer is fusible at a temperature of less than 180° C.;
(iii) wherein one or more of the discrete interconnected layers is associated with the fusible polymer;
(iv) wherein the multilayered stack is coated with the finishing resin layer and wherein the finishing resin layer and the fusible polymer are different;
(v) calendering the material;
(vi) curing the curable material; and
(vii) wherein the treated material is subjected to tumbling, so that the treated material resembles leather.

11. A nonwoven material comprising:
a finishing resin layer; and
a multilayered stack, the multilayered stack comprising discrete interconnected layers, each of the layers, which may be the same or different, comprising a composite fibre which is a mixture of:
from about 80 to 95% w/w of air-laid enzymatically degummed leaf fibre or enzymatically degummed stem fibre or mixtures thereof; said leaf or stem fibres or mixtures thereof being degummed with one or more enzymes selected from the group consisting of polygalacturonase, pectinesterase, pectinic lyase and hemicellulase, and mixtures thereof;
(ii) from about 5 to 20% w/w of a fusible polymer, wherein the polymer is fusible at a temperature of less than 180° C.;
(iii) wherein one or more of the discrete interconnected layers is associated with the fusible polymer;
(iv) wherein the multilayered stack is coated with the finishing resin layer and wherein the finishing resin layer and the fusible polymer are different.

12. A nonwoven material comprising:
a finishing resin layer; and
a multilayered stack, the multilayered stack comprising discrete interconnected layers, each of the layers, which may be the same or different, comprising a composite fibre which is a mixture of:
from about 80 to 95% w/w of air-laid enzymatically degummed leaf fibre or enzymatically degummed stem fibre or mixtures thereof said leaf or stem fibres or mixtures thereof being degummed at a temperature of about 40° C.;

(ii) from about 5 to 20% w/w of a fusible polymer, wherein the polymer is fusible at a temperature of less than 180° C.;
(iii) wherein one or more of the discrete interconnected layers is associated with the fusible polymer;
(iv) wherein the multilayered stack is coated with the finishing resin layer and wherein the finishing resin layer and the fusible polymer are different:
(v) calendering and curing the material; and
(vi) wherein the treated material is subjected to tumbling, so that the treated material resembles leather.

13. The material according to claim 12 wherein the leaf fibre comprises leaves of one or more plants of the Bromeliaceae family.

14. The material according to claim 12 wherein the leaf fibre comprises a relatively high content of the leaves of *Ananas Comosus* (Linn), pineapple.

15. The material according to claim 12 wherein the material comprises fibres having a linear mass density of from about 10 to 20 tex.

16. A nonwoven material according to claim 12 wherein the leaf fibres or stem fibres have a length of from about 2 to 12 cm.

17. A nonwoven material according to claim 12 wherein the fusible material is a resin.

18. The material according to claim 12 wherein the material is an artificial leather.

19. The material according to claim 12 wherein the degummed leaf fibre or degummed stem fibre or mixtures thereof are enzymatically degummed with one or more enzymes selected from the group consisting of polygalacturonase, pectinesterase, pectinic lyase, hemicellulase, pectinase and cellulase, and mixtures thereof.

20. The material according to claim 12 wherein the degummed leaf fibre or degummed stem fibre or mixtures thereof are enzymatically degummed with one or more enzymes selected from the group consisting of polygalacturonase, pectinesterase, pectinic lyase and hemicellulase, and mixtures thereof.

21. The material according to claim 12 wherein the degummed leaf fibre or degummed stem fibre or mixtures thereof are enzymatically degummed with a mixture of polygalacturonase, pectinesterase, pectinic lyase and hemicellulase (Biopectinase) or a mixture of polygalacturonase and hemicellulase.

22. The material according to claim 12 wherein the degummed leaf fibre or degummed stem fibre or mixtures thereof are enzymatically degummed with a mixture of polygalacturonase and hemicellulase.

23. The material according to claim 1 wherein the material is an artificial leather.

24. The material according to claim 1 wherein the degummed leaf fibre or degummed stem fibre or mixtures thereof are enzymatically degummed with one or more enzymes selected from the group consisting of polygalacturonase, pectinesterase, pectinic lyase, hemicellulase, pectinase and cellulase, and mixtures thereof.

25. The material according to claim 1 wherein the degummed leaf fibre or degummed stem fibre or mixtures thereof are enzymatically degummed with one or more enzymes selected from the group consisting of polygalacturonase, pectinesterase, pectinic lyase and hemicellulase, and mixtures thereof.

26. The material according to claim 1 wherein the degummed leaf fibre or degummed stem fibre or mixtures thereof are enzymatically degummed with a mixture of polygalacturonase, pectinesterase, pectinic lyase and hemicellulase (Biopectinase) or a mixture of polygalacturonase and hemicellulase.

27. The material according to claim 1 wherein the degummed leaf fibre or degummed stem fibre or mixtures thereof are enzymatically degummed with a mixture of polygalacturonase and hemicellulase.

28. The material according to claim 4 wherein the leaf fibre comprises leaves of one or more plants of the Bromeliaceae family.

29. The material according to claim 4 wherein the leaf fibre comprises a relatively high content of the leaves of *Ananas Comosus* (Linn), pineapple.

30. The material according to claim 4 wherein the material comprises fibres having a linear mass density of from about 10 to 20 tex.

31. A nonwoven material according to claim 4 wherein the leaf fibres or stem fibres have a length of from about 2 to 12 cm.

32. A nonwoven material according to claim 4 wherein the fusible material is a resin.

33. The material according to claim 10 wherein the leaf fibre comprises leaves of one or more plants of the Bromeliaceae family.

34. The material according to claim 10 wherein the leaf fibre comprises a relatively high content of the leaves of *Ananas Comosus* (Linn), pineapple.

35. The material according to claim 10 wherein the material comprises fibres having a linear mass density of from about 10 to 20 tex.

36. A nonwoven material according to claim 10 wherein the leaf fibres or stem fibres have a length of from about 2 to 12 cm.

37. A nonwoven material according to claim 10 wherein the fusible material is a resin.

38. The material according to claim 10 wherein the material is an artificial leather.

39. The material according to claim 10 wherein the degummed leaf fibre or degummed stem fibre or mixtures thereof are enzymatically degummed with one or more enzymes selected from the group consisting of polygalacturonase, pectinesterase, pectinic lyase, hemicellulase, pectinase and cellulase, and mixtures thereof.

40. The material according to claim 10 wherein the degummed leaf fibre or degummed stem fibre or mixtures thereof are enzymatically degummed with one or more enzymes selected from the group consisting of polygalacturonase, pectinesterase, pectinic lyase and hemicellulase, and mixtures thereof.

41. The material according to claim 10 wherein the degummed leaf fibre or degummed stem fibre or mixtures thereof are enzymatically degummed with a mixture of polygalacturonase, pectinesterase, pectinic lyase and hemicellulase (Biopectinase) or a mixture of polygalacturonase and hemicellulase.

42. The material according to claim 10 wherein the degummed leaf fibre or degummed stem fibre or mixtures thereof are enzymatically degummed with a mixture of polygalacturonase and hemicellulase.

43. A nonwoven material according to claim 11 wherein the leaf fibres or stem fibres have a length of from about 2 to 12 cm.

44. A nonwoven material according to claim 11 wherein the fusible material is a resin.

45. The material according to claim 11 wherein the material is an artificial leather.

46. The material according to claim 11 wherein the degummed leaf fibre or degummed stem fibre or mixtures thereof are enzymatically degummed with one or more enzymes selected from the group consisting of polygalacturonase, pectinesterase, pectinic lyase, hemicellulase, pectinase and cellulase, and mixtures thereof.

47. The material according to claim 11 wherein the degummed leaf fibre or degummed stem fibre or mixtures thereof are enzymatically degummed with one or more enzymes selected from the group consisting of polygalacturonase, pectinesterase, pectinic lyase and hemicellulase, and mixtures thereof.

48. The material according to claim 11 wherein the degummed leaf fibre or degummed stem fibre or mixtures thereof are enzymatically degummed with a mixture of polygalacturonase, pectinesterase, pectinic lyase and hemicellulase (Biopectinase) or a mixture of polygalacturonase and hemicellulase.

49. The material according to claim 11 wherein the degummed leaf fibre or degummed stem fibre or mixtures thereof are enzymatically degummed with a mixture of polygalacturonase and hemicellulase.

50. The material according to claim 1 wherein the leaf fibre comprises leaves of one or more plants of the Bromeliaceae family.

51. The material according to claim 1 wherein the leaf fibre comprises a relatively high content of the leaves of *Ananas Comosus* (Linn), pineapple.

52. The material according to claim 1 wherein the material comprises fibres having a linear mass density of from about 10 to 20 tex.

\* \* \* \* \*